United States Patent
Rajendran

(10) Patent No.: US 11,608,880 B2
(45) Date of Patent: Mar. 21, 2023

(54) DIRECT ACTING ELECTRONIC LOCKING DIFFERENTIAL

(71) Applicant: Eaton Intelligent Power Limited, Dublin (IE)

(72) Inventor: Dileep Rajendran, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/370,310

(22) Filed: Jul. 8, 2021

(65) Prior Publication Data

US 2021/0356027 A1 Nov. 18, 2021

Related U.S. Application Data

(63) Continuation of application No. PCT/EP2020/025005, filed on Jan. 10, 2020.

(30) Foreign Application Priority Data

Jan. 10, 2019 (IN) .............................. 201911001161

(51) Int. Cl.
*F16H 48/34* (2012.01)
*F16H 48/24* (2006.01)
*F16H 48/08* (2006.01)

(52) U.S. Cl.
CPC ............. *F16H 48/34* (2013.01); *F16H 48/24* (2013.01); *F16H 48/08* (2013.01); *F16H 2048/346* (2013.01)

(58) Field of Classification Search
CPC .... F16H 48/34–2048/346; F16H 48/24; F16H 48/08–2048/087; F16D 11/14–16
See application file for complete search history.

(56) References Cited

U.S. PATENT DOCUMENTS 5,947,859 A * 9/1999 McNamara ............. F16H 48/08
  425/231
6,551,209 B2   4/2003 Cheadle et al.
(Continued)

FOREIGN PATENT DOCUMENTS

CN    206904181 U    1/2018
CN    207278827 U    4/2018
CN    111765232 A  * 10/2020

OTHER PUBLICATIONS

International Search Report and Written Opinion for International Application No. PCT/EP2020/025005 dated Apr. 17, 2020.

*Primary Examiner* — Huan Le
*Assistant Examiner* — James J Taylor, II
(74) *Attorney, Agent, or Firm* — RMCK Law Group PLC

(57) ABSTRACT

An electronically actuated locking differential includes a gear case having opposite first and second ends, a differential gear set disposed in the gear case, a lock plate disposed at the gear case first end and configured to selectively engage the differential gear set, and an electronic actuator disposed at the gear case second end and coupled to the lock plate via at least one rod. The electronic actuator is operable between an unlocked first mode where the lock plate does not lockingly engage the differential gear set, and a locked second mode where the electronic actuator pulls the at least one rod to thereby pull the lock plate into locking engagement with the differential gear set to thereby lock a pair of axle shafts.

16 Claims, 3 Drawing Sheets

(56) References Cited

U.S. PATENT DOCUMENTS

| | | | |
|---|---|---|---|
| 7,264,569 B2 * | 9/2007 | Fox | F16H 48/24 |
| | | | 475/241 |
| 9,546,696 B2 * | 1/2017 | Oram | B60K 23/08 |
| 9,556,945 B2 | 1/2017 | Fox | |
| 9,625,026 B2 * | 4/2017 | Goehren | F16H 48/34 |
| 9,657,827 B2 * | 5/2017 | Gopal | F16H 48/24 |
| 10,391,861 B2 * | 8/2019 | Richards | B60K 17/165 |
| 2014/0235397 A1 | 8/2014 | McMillan et al. | |

* cited by examiner

DIRECT ACTING ELECTRONIC LOCKING DIFFERENTIAL

CROSS-REFERENCE TO RELATED APPLICATIONS

This application is a continuation of International Application No. PCT/EP2020/025005 filed Jan. 10, 2020, which claims the benefit of Indian patent application No. 201911001161 filed on Jan. 10, 2019. The disclosure of the above application is incorporated herein in its entirety by reference thereto.

FIELD

The present disclosure relates generally to electronically actuated locking differentials and, more particularly, to a reduced bearing span electronically actuated locking differential having a compact locking plate, armature, and stator arrangement.

BACKGROUND

In automotive applications, an electronically actuated locking differential of the related art may be actuated electronically and is designed for forward-wheel-drive (FWD), rear-wheel-drive (RWD), all-wheel-drive (AWD), and four-wheel-drive (4WD) vehicles to allow the differential to be locked or unlocked when it is so desired. The driver can lock the front and/or rear wheels by manually activating a switch or button mounted to a dash or console of the vehicle. However, as vehicles and associated systems become more complex, vehicle component packaging also becomes more challenging. Accordingly, it is desirable to provide a more compact electronically actuated locking differential.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one example aspect, an electronically actuated locking differential is provided. The electronically actuated locking differential includes a gear case having opposite first and second ends, a differential gear set disposed in the gear case, a lock plate disposed at the gear case first end and configured to selectively engage the differential gear set, and an electronic actuator disposed at the gear case second end and coupled to the lock plate via at least one rod. The electronic actuator is operable between an unlocked first mode where the lock plate does not lockingly engage the differential gear set, and a locked second mode where the electronic actuator pulls the at least one rod to thereby pull the lock plate into locking engagement with the differential gear set to thereby lock a pair of axle shafts.

In addition to the foregoing, the described electronically actuated locking differential may include one or more of the following features: wherein the differential gear set includes a first side gear and a second side gear, the lock plate configured to selectively lockingly engage the first side gear in the locked second mode; wherein the lock plate is disposed outboard of the first side gear, and the electronic actuator is disposed outboard of the second side gear; and a biasing mechanism disposed between the first side gear and the lock plate, the biasing mechanism configured to bias the lock plate out of engagement with the first side gear.

In addition to the foregoing, the described electronically actuated locking differential may include one or more of the following features: wherein the first side gear is disposed between the lock plate and the second side gear, and the second side gear is disposed between the first side gear and the electronic actuator; wherein the first and second side gears are disposed between the lock plate and the electronic actuator; wherein the lock plate has a plurality of protrusions on an outer circumference of the lock plate; and wherein the plurality of protrusions are received within slots formed in an inner wall of the gear case.

In addition to the foregoing, the described electronically actuated locking differential may include one or more of the following features: wherein each protrusion of the plurality of protrusions defines an aperture configured to receive the at least one rod therethrough; wherein the plurality of protrusions comprises eight protrusions, and the at least one rod comprises eight rods, wherein each protrusion receives one of the rods; wherein the at least one rod extends through an aperture formed in the gear case; and wherein the at least one rod is received within an aperture formed in the electronic actuator.

In addition to the foregoing, the described electronically actuated locking differential may include one or more of the following features: wherein the lock plate has a plurality of radially disposed dog teeth on a first face of the lock plate, the radially disposed dog teeth configured to meshingly engage a side gear of the differential gear set; wherein the radially disposed dog teeth are a first set of dog teeth configured to meshingly engage a second set of dog teeth formed on a surface of the side gear; wherein the electronic actuator includes an electromagnetic coil and a stator; and wherein the electromagnetic coil and the stator are disposed outside of the gear case and the lock plate is disposed within the gear case.

In addition to the foregoing, the described electronically actuated locking differential may include one or more of the following features: wherein the electronic actuator further includes an armature; wherein the armature is disposed outside of the gear case; wherein the at least one rod includes a plurality of rods coupled between the lock plate and an armature of the electronic actuator; and wherein the at least one rod includes a first end coupled to the lock plate and an opposite second end coupled to an armature of the of the electronic actuator.

BRIEF DESCRIPTION OF THE DRAWINGS

The present disclosure will become more fully understood from the detailed description and the accompanying drawings, wherein.

DETAILED DESCRIPTION

Figure 1:
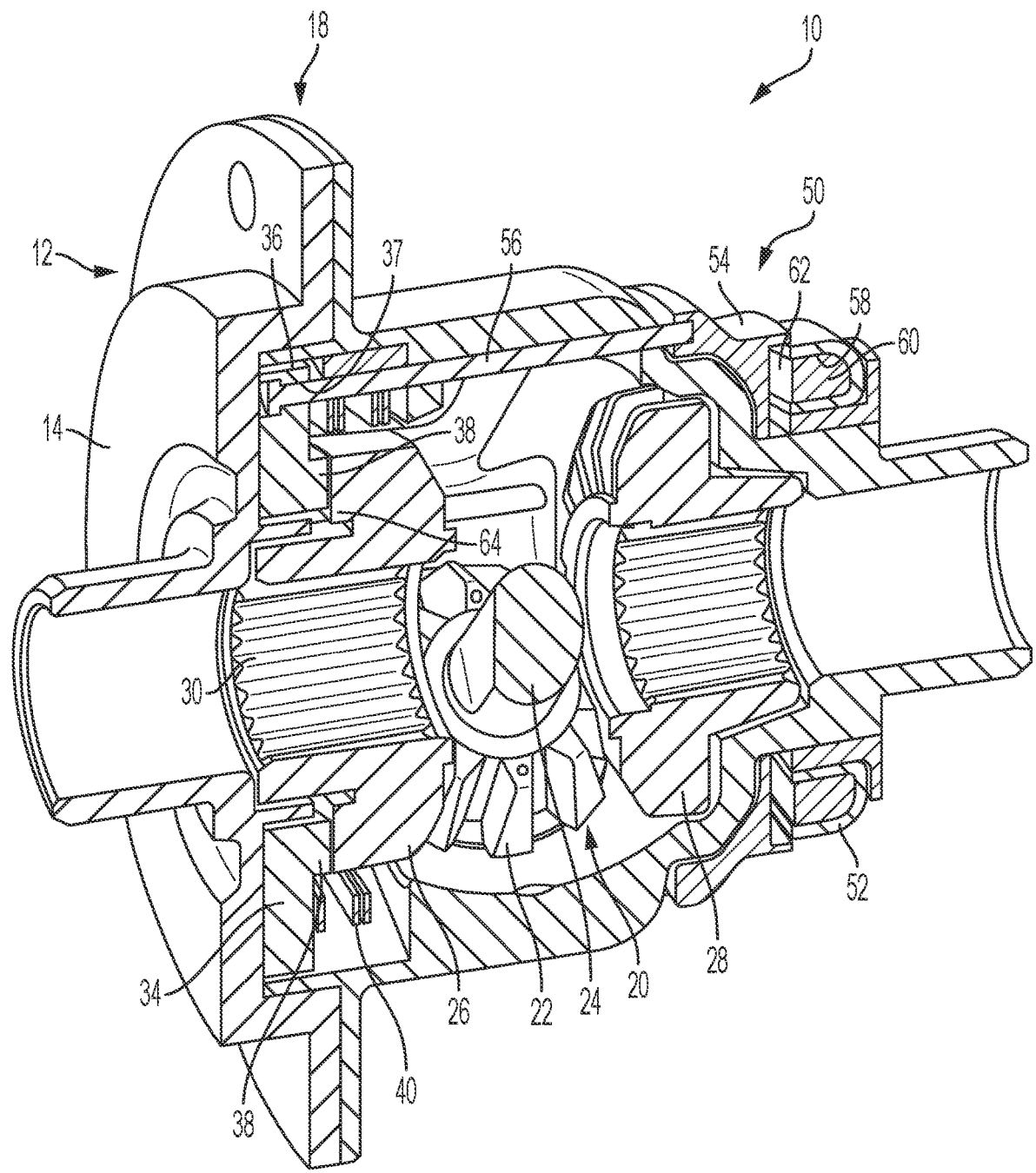
FIG. 1 is a perspective sectional view of an electronically actuated locking differential constructed in accordance to one example of the present disclosure.
Figure 2:
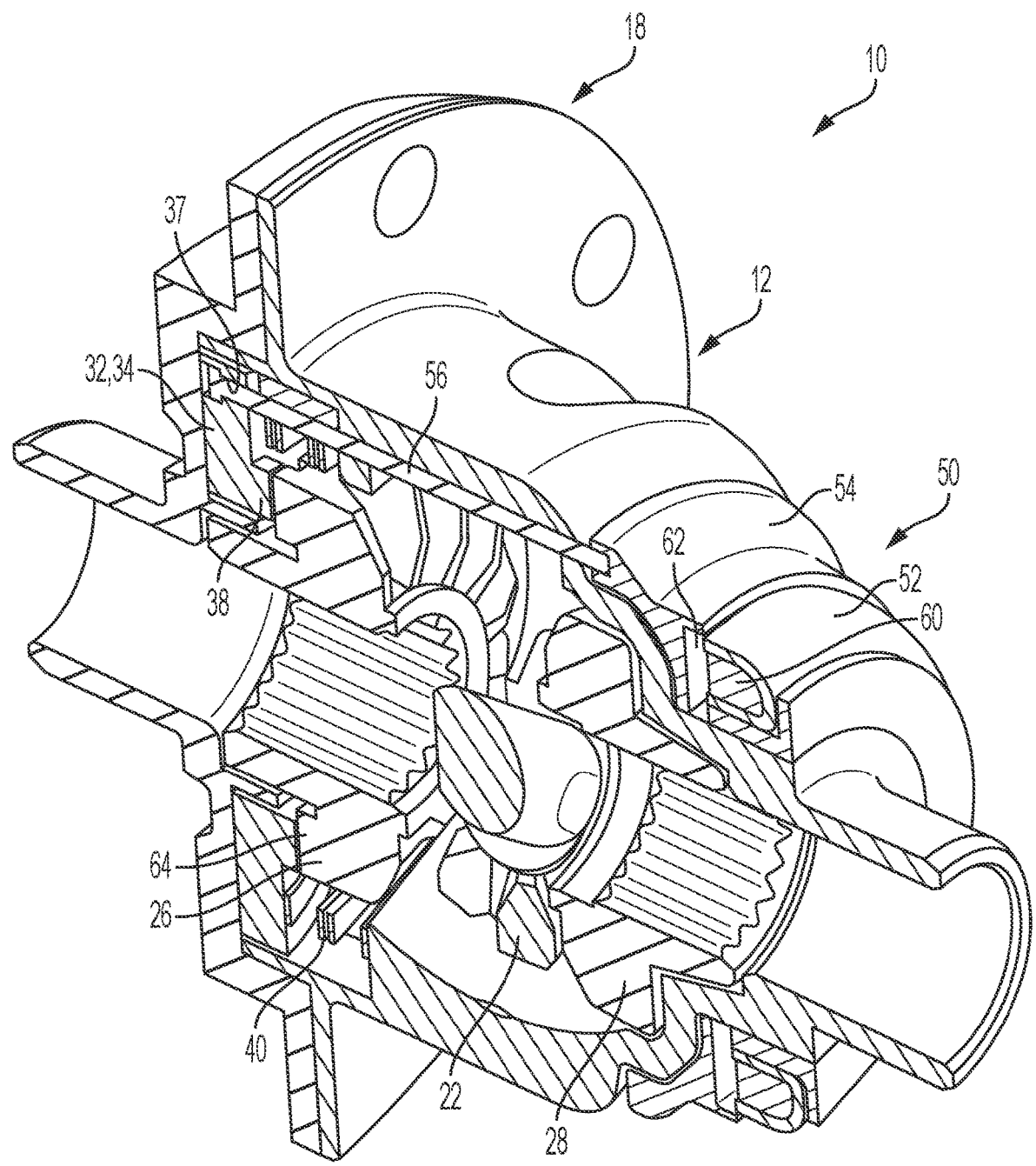
FIG. 2 is another perspective sectional view of the electronically actuated locking differential shown in FIG. 1.

With initial reference to FIGS. 1 and 2, an electronically actuated locking differential is generally indicated at 10. The electronically actuated locking differential 10 generally includes a gear case 12 formed by coupling (e.g., bolting) a hub portion 14 and housing portion 16. Torque input to the differential is typically by an input ring gear (not shown), which may be attached to a flange 18 of the gear case 12. Each of the hub portion 14 and the housing portion 16 of the gear case 12 may be mounted to a bearing set (not shown) to provide rotational support for the differential 10 relative to an outer housing or carrier (not shown).

The gear case 12 defines a gear chamber 20, which generally supports a differential gear set including a pair of input pinion gears 22 rotatably mounted on a pinion shaft 24, which is secured relative to the gear case 12 by any suitable mechanism. The pinion gears 22 are meshingly engaged with a respective pair of left and right side gears 26, 28. The side gears 26, 28 define respective sets of internal, straight splines 30 that are adapted to be in splined engagement with mating external splines on a respective pair of left and right axle shafts (not shown).

The electronically actuated locking differential 10 further includes a rotation prevention mechanism 32 configured to selectively prevent relative rotation of the left and right axle shafts. The rotation prevention mechanism 32 is disposed within gear case 12 and generally includes a lock plate 34 operably associated with side gear 26 (the first output gear).

In the example embodiment, the lock plate 34 is spaced apart from and faces the side gear 26. The lock plate 34 includes a plurality of circumferential protrusions 36 and a plurality of radially spaced dog teeth 38 (e.g., see FIG. 3). The circumferential protrusions 36 are disposed on an outer diameter circumference of lock plate 34 and are configured to be received within slots (not shown) formed within an inner wall of the gear case 12 to prevent relative rotation between the lock plate 34 and the gear case 12. In the illustrated example, each circumferential protrusion 36 defines an aperture 37. The dog teeth 38 are formed on a surface facing toward the side gear and are configured to selectively engage the side gear 26, as described herein in more detail. In the example configuration, the lock plate 34 is biased toward a non-actuated, unlocked mode by a biasing mechanism 40 such as, for example, a wave spring.

In the example embodiment, an electronic actuator 50 is disposed primarily external to the gear case 12 in a location opposite the flange 18 at a bell end of the gear case 12 and adjacent to side gear 28 (the second output gear). The electronic actuator 50 generally includes a stator 52, an armature 54, and a plurality of pins or pull rods 56.

Figure 3:
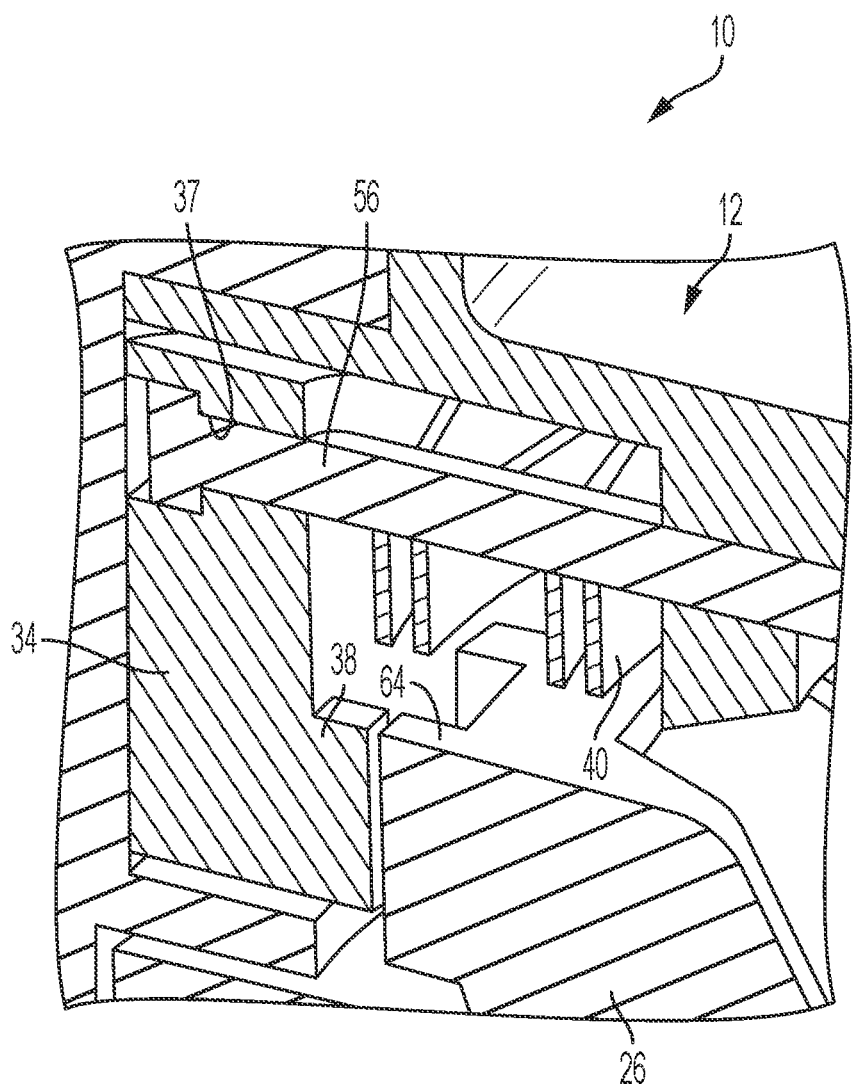
FIG. 3 is an enlarged view of a portion of the electronically actuated locking differential shown in FIG. 2.

In the illustrated example shown in FIGS. 1 and 2, the stator 52 defines a cavity 58 configured to receive an electromagnetic coil 60. The coil 60 is configured to be energized via electrical leads (not shown) and receive direct current (DC) for a power source (not shown) such as a vehicle battery. The armature 54 is a generally circular or annular plate that is spaced apart from the stator 52 by a gap 62. In the example embodiment, the armature 54 is mechanically coupled to the lock plate 34 via the plurality of pull rods 56, which extend through protrusion apertures 37, the gear case 12 and the gear chamber 20, as shown in FIGS. 1-3. Accordingly, as illustrated, the lock plate 34 is configured at an opposite end of the gear case 12 relative to the stator 52 and armature 54. Such a configuration advantageously provides a more compact arrangement of differential 10 than previously known systems.

As shown in FIG. 3, protrusion apertures 37 are counterbored to receive a larger diameter end of the pull rod 56. In the illustrated example, lock plate 34 includes eight circumferential protrusions 37 each receiving one of eight pull rods 56. However, it will be appreciated that any suitable number of circumferential protrusions 37 and pull rods 56 may be utilized that enable differential 10 to function as described herein.

During normal, straight-ahead operation of a vehicle within which the differential 10 is employed, no differentiation occurs between the left and right axle shaft or side gears 26, 28. Therefore, the pinion gears 22 do not rotate relative to the pinion shaft 24. As a result, the gear case 12, pinion gears 22, and side gears 26, 28 all rotate about an axis of rotation as if the gear case 12, pinion gears 22, and side gears 26, 28 are a solid unit.

When direct current (DC) power is supplied to the electromagnetic coil 60, magnetic energy is generated within the stator 52, which creates an attractive force between the stator 52 and armature 54, thereby causing the armature 54 to move toward the stator 52. This in turn causes the pull rods 56 to move toward the stator 52, which translates the lock plate 34 toward and into locking engagement with side gear 26 as it compresses biasing mechanism 40. Lock plate teeth 38 meshingly engage a plurality of side gear teeth 64 until lock plate 34 exerts a required retarding torque on the side gear 26, locking it to the differential case 12 and thus locking the left and right axle shafts independent of driveline rotation.

The differential 10 may be controlled manually, wherein a driver of the vehicle manually selects "locked" mode (rather than "unlocked" mode) to operate the differential 10. For example, when, say the vehicle is at rest, the driver simply manually activates a switch or button (not shown), such as a simple momentary-type "on/off" toggle or rocker switch or push button, mounted to a dash or console (not shown) of the vehicle. In this way, an electric circuit (not shown) is closed, thereby turning on current in the circuit and a lamp (not shown) located in or near the toggle switch or push button to indicate to the driver that the differential is actuated. Current flows in the circuit and ultimately to the electromagnetic coil 60 of the differential 10. The differential 10 then operates in the "locked" mode (i.e., when the vehicle is in first gear or reverse). In this way, the first output gear 26 is locked relative to the gear case 12, preventing any further differentiation between the first output gear 26 and gear case 12.

Described herein are systems and methods for providing a compact packaging arrangement for a direct acting electronic locking differential. The system includes an electronic actuator disposed opposite a rotation prevention mechanism that includes a lock plate. The electronic actuator includes an armature connected to the lock plate via a plurality of pull rods. When actuated, the armature is drawn toward a stator, thereby drawing the lock plate (via the pull rods) toward and into meshing engagement with a side gear of the differential. Such an arrangement advantageously reduces bearing span thereby enabling packaging in small areas, for example, within transaxles gear boxes.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An electronically actuated locking differential comprising:
   a gear case having a first end and an opposite bell end, the gear case defining a gear chamber between the first end and the opposite bell end;
   a differential gear set disposed in the gear case, the differential gear set including a first side gear and a second side gear;
   a lock plate disposed at the gear case first end and configured to selectively engage the differential gear set;
   an electronic actuator disposed at the gear case bell end and coupled to the lock plate via at least one rod, the electronic actuator including a stator and an armature, the stator having an electromagnetic coil that, when energized, causes the armature and the at least one rod to move toward the stator, wherein the at least one rod includes a larger diameter first end coupled to the lock plate and an opposite second end coupled to the armature; and
   a biasing mechanism disposed in the gear chamber between the first side gear and the lock plate, the biasing mechanism comprising a wave spring disposed exclusively inboard of the at least one rod and configured to bias the lock plate out of engagement with the first side gear;
   wherein the electronic actuator is operable between an unlocked first mode where the lock plate does not lockingly engage the differential gear set, and a locked second mode where the electronic actuator pulls the at least one rod to thereby pull the lock plate into locking engagement with the differential gear set to thereby lock a pair of axle shafts, the lock plate configured to selectively lockingly engage the first side gear in the locked second mode.

2. The electronically actuated locking differential of claim 1, wherein the lock plate is disposed outboard of the first side gear, and the electronic actuator is disposed outboard of the second side gear.

3. The electronically actuated locking differential of claim 2, wherein the first side gear is disposed between the lock plate and the second side gear, and the second side gear is disposed between the first side gear and the electronic actuator.

4. The electronically actuated locking differential of claim 2, wherein the first and second side gears are disposed between the lock plate and the electronic actuator.

5. The electronically actuated locking differential of claim 1, wherein the lock plate has a plurality of protrusions on an outer circumference of the lock plate.

6. The electronically actuated locking differential of claim 5, wherein the plurality of protrusions are received within slots formed in an inner wall of the gear case.

7. The electronically actuated locking differential of claim 5, wherein each protrusion of the plurality of protrusions defines an aperture configured to receive the at least one rod therethrough.

8. The electronically actuated locking differential of claim 7, wherein the plurality of protrusions comprises eight protrusions, and the at least one rod comprises eight rods, wherein each protrusion receives one of the rods.

9. The electronically actuated locking differential of claim 7, wherein the at least one rod extends through an aperture formed in the gear case.

10. The electronically actuated locking differential of claim 9, wherein the at least one rod is received within an aperture formed in the electronic actuator.

11. The electronically actuated locking differential of claim 1, wherein the lock plate has a plurality of radially disposed dog teeth on a first face of the lock plate, the radially disposed dog teeth configured to meshingly engage the first side gear of the differential gear set.

12. The electronically actuated locking differential of claim 11, wherein the radially disposed dog teeth are a first set of dog teeth configured to meshingly engage a second set of dog teeth formed on a surface of the first side gear.

13. The electronically actuated locking differential of claim 11, wherein the at least one rod includes a plurality of rods coupled between the lock plate and the armature of the electronic actuator.

14. The electronically actuated locking differential of claim 1, wherein the electromagnetic coil and the stator are disposed outside of the gear case and the lock plate is disposed within the gear case.

15. The electronically actuated locking differential of claim 14, wherein the armature is disposed outside of the gear case.

16. The electronically actuated locking differential of claim 1 wherein the lock plate includes a plurality of circumferential protrusions disposed on an outer diameter circumference of the lock plate, each circumferential protrusion defining an aperture that receives the larger diameter first end of the at least one rod.

* * * * *